United States Patent [19]

Hayashi et al.

[11] Patent Number: 4,801,258

[45] Date of Patent: Jan. 31, 1989

[54] APPARATUS FOR QUANTITATIVELY EXTRUDING FOOD MATERIAL

[75] Inventors: Torahiko Hayashi; Koichi Hirabayashi; Yasunori Tashiro, all of Utsunomiya, Japan

[73] Assignee: Rheon Automatic Machinery Co., Ltd., Utsunomiya, Japan

[21] Appl. No.: 157,809

[22] Filed: Feb. 19, 1988

[30] Foreign Application Priority Data

Feb. 23, 1987 [JP] Japan ..................... 62-39963
Jun. 12, 1987 [JP] Japan ..................... 62-146685

[51] Int. Cl.⁴ ..................... A23P 1/12

[52] U.S. Cl. ..................... 425/238; 418/15; 425/239; 425/241; 426/486

[58] Field of Search ..................... 418/15, 206; 425/238, 425/239, 240, 241, 331, DIG. 230; 426/486, 496

[56] References Cited

U.S. PATENT DOCUMENTS

| | | | |
|---|---|---|---|
| 2,280,272 | 4/1942 | Sullivan | 418/15 |
| 2,485,595 | 10/1949 | Hammann | 12/79.6 |
| 3,481,283 | 12/1969 | Vogt | 425/241 |
| 3,526,470 | 9/1970 | Swanson | 418/15 |
| 3,773,448 | 11/1973 | Poot | 425/241 |

FOREIGN PATENT DOCUMENTS

| | | | |
|---|---|---|---|
| 1067648 | 6/1954 | France | 425/241 |
| 367027 | 1/1939 | Italy | 425/241 |

*Primary Examiner*—Jay H. Woo
*Assistant Examiner*—C. Scott Bushey
*Attorney, Agent, or Firm*—Finnegan, Henderson, Farabow, Garrett & Dunner

[57] ABSTRACT

An apparatus for quantitatively extruding food material is provided. In this apparatus the material is introduced into the space formed between the periphery of a drum and the side wall of a housing. The drum has an inner chamber between its inner wall and the periphery of a cam. A pair of blades is inserted into slits formed on the drum form a compartment in the outside of the drum and a compartment in the inner chamber.

Since the dimensions of the space in the compartment outside of the drum decrease towards the exit port, while the space of the inner chamber increases, the pressure in the space becomes much higher than that of the inner chamber. Thus the air in the material is drawn out of the outer compartment into the inner chamber via a path formed between the recess on the trailing surface of the blade and the wall of the slit. As a result material of a uniform quantity and density, and that has no air entrainment, is extruded from the exit port.

8 Claims, 3 Drawing Sheets

APPARATUS FOR QUANTITATIVELY EXTRUDING FOOD MATERIAL

BACKGROUND OF THE INVENTION

1. Field of the Invention

This invention relates to an apparatus for quantitatively extruding food material, typically a plastic food material, and more particularly to an apparatus for supplying a continuous body of food material uniform in quantity and density throughout the portions of the body, while removing air trapped during the process.

2. Prior Art

In prior art various types of apparatuses for supplying plastic material were developed.

U.S. Pat. No. 2,485,595 discloses an apparatus for quantitatively dispensing plastic material in which a rotating screw in a cylindrical chamber feeds the material. However, this apparatus does not have a feature to remove air that is in the material before the material is discharged. When an operator supplies plastic material into a hopper air tends to be trapped in the plastic material. The plastic material that then has the air in it, and thus which does not have a uniform density, is introduced into the apparatus. Thus, the apparatus does not supply masses of the plastic material uniform in quantity.

U.S. Pat. No. 3,526,470 discloses a pump for circulating a viscous liquid product that has a feature to remove gas from the product. However, this apparatus is not designed to quantitatively supply plastic material.

There has been no apparatus invented that can quantitatively supply plastic material by feeding it through a narrow and lengthy passage while removing air trapped in the material.

SUMMARY OF THIS INVENTION

One object of this invention is to provide an apparatus for quantitatively extruding food material while removing air trapped in the material.

Another object of it is to provide an apparatus for extruding food material at a uniform flow rate without any pulsation.

According to one aspect of this invention an apparatus for quantitatively extruding food material is provided, comprising (a) a hopper for the food material, (b) an eccentrically formed cylindrical housing mounted to the bottom of said hopper, having a cylindrical side wall, which is open at the top part that faces the hopper, and two end walls, and which housing has an exit port positioned away from said hopper, (c) a rotating hollow cylindrical drum disposed in said housing, operatively connected to an axis, said axis in turn being connected to a motor, said drum having a plurality of slits formed radially through the peripheral body thereof and extending in the axial direction of said peripheral body, said side wall of said housing so formed that the periphery of said drum and the inner surface of said side wall of said housing downstream of said hopper in the direction of rotation of said drum defining a space progressively narrowing in its cross-section toward said exit port, and slidably engaging each other downstream of said exit port in the direction of rotation of said drum, (d) a plurality of blades, inserted into each of said slits, and of cross-sectional dimensions defined such that they slidably fit in said slits, each said blade being provided with a recess on its trailing surface extending in the radial direction over a distance slightly greater than the thickness of the peripheral body of said drum, (e) an eccentric cylindrical cam mounted on said axis of said drum, the periphery thereof being radially spaced apart from the inner surface of said side wall of said housing by a distance equal to the radial width of said blades, engaging said peripheral body of said drum at the top part of said drum and being progressively separated from said peripheral body in the direction of rotation of the drum, defining an inner chamber together with the end walls of the housing, and enlarging in its cross-section toward said exit port, and (f) an exit path connecting said inner chamber to said hopper, wherein each of said blades is slidably movable, along with the rotation of said drum, along said periphery of said eccentric cam and said inner surface of said side wall of said housing so that when the rotation brings said blade to face the bottom of said hopper, the outward portion of said blade is arranged to protrude into said hopper to introduce said food material into said space, while said recess on said blade provides a path from said space to said inner chamber for releasing into said inner chamber the air trapped in a compartment formed by the two adjacent said blades with the drum and the housing, and to retract to a point where the outward end of said blade becomes flush with the periphery of said drum when said blade has moved past said exit port.

One of the important features of this invention is that the apparatus is structured so that air is removed from the food material before the apparatus extrudes the material. The apparatus of this invention uses a cylindrical housing, and a rotating drum inside the housing, positioned below the hopper for the food material. The material is fed between the inner wall of the housing and the drum to an exit positioned away from the hopper, and it is urged by blades located on the surface of the drum and which abut the inner surface of the housing. When the food material is fed, air trapped in it tends to gather at the downstream end of the material being conveyed. Thus every compartment formed by any two adjacent pair of blades, the outer surface of the drum, and the inner surface of the housing, tends to contain air at its downstream end. In this invention each blade slidably engages a complementary slit formed on the peripheral body of the drum and is fixed between the inner wall of the housing and the outer wall of a cam positioned inside the peripheral body of the drum, as will be explained below in further detail. A recess is provided on the trailing surface of each blade in such a way that the air trapped in the downstream end of the space is released into the inner chamber via a path formed between the inner wall of the slit and the recess on the blade. The air is then discharged from the inner chamber to the hopper via an exit path. Thus the food material, without air entrainment and having a uniform density, is extruded from the exit port.

In this invention air is effectively removed from food material because of the following reasons: Since the capacity of the compartment defined by an adjacent pair of blades and the periphery of the drum and the inner wall of the housing is arranged to gradually decrease as it moves downstream along with the rotation of the drum, the pressure in the compartment gradually increases. In contrast, in the inside of the peripheral body of the drum a compartment is gradually formed as the cam surface and the inner wall of the peripheral body of the drum separate from each other, such compartment being defined by them and a blade or an adjacent pair of blades. The capacity of the compartment in the inner chamber increase when the blades move downstream along with the rotation of the drum, and thus the pressure in the compartment decreases. Because the pressure in the compartment outside of the drum becomes much higher than that of the inner chamber, the air trapped in the outer compartment is drawn from it into the inner chamber. This pressure difference also forces a fractional amount of the material into the inner chamber, while only the material fills the space in the outer compartment. Thus, when the material is discharged from the exit port, it is extruded in a uniform quantity and density throughout the continuum of the material.

EMBODIMENTS

The preferred embodiment of this invention will now be described by reference to the drawings.

Figure 1:
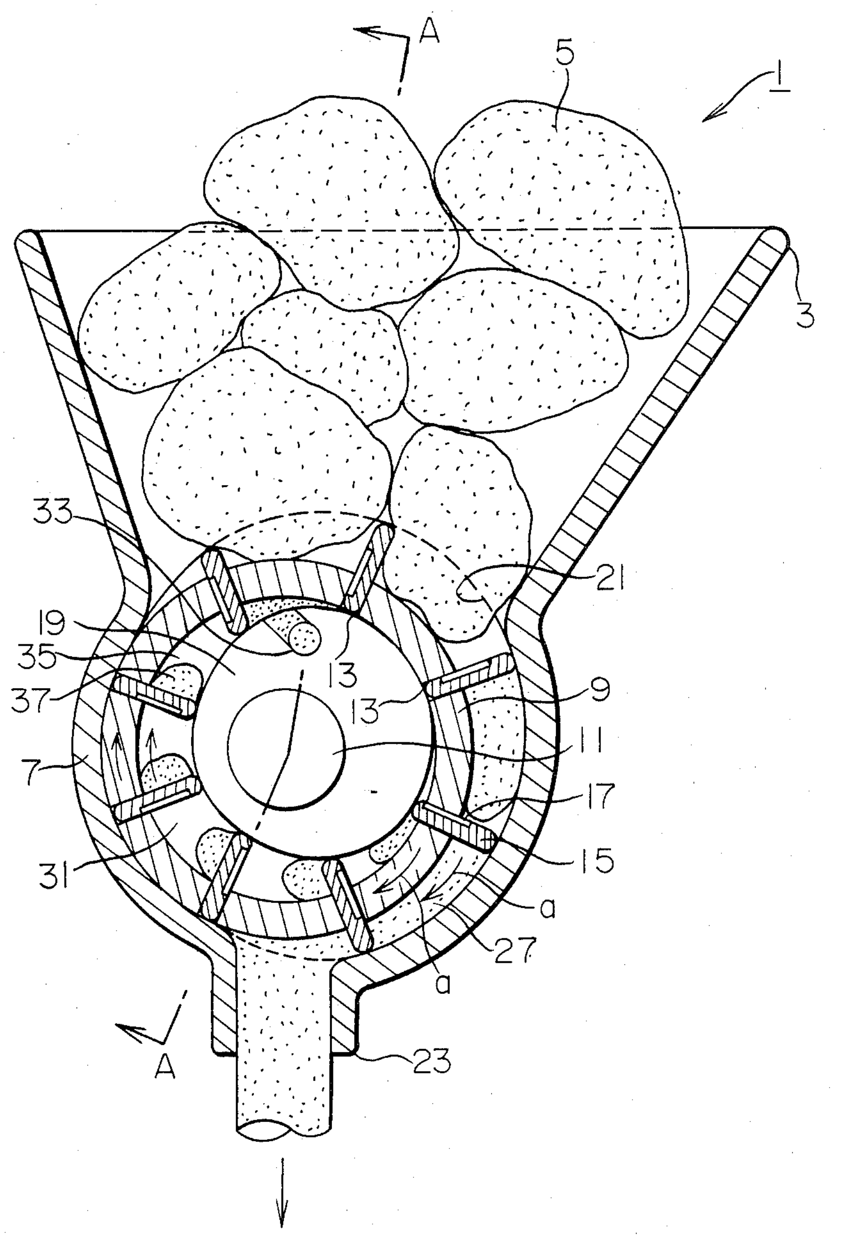
FIG. 1 shows an apparatus of a first embodiment of this invention.

The apparatus (1) includes a hopper (3) for the food material (5) an eccentrically formed cylindrical housing (7) integrally mounted to the bottom of the hopper (3). In FIG. 1 the walls of the housing (7) are integrally connected to the walls of the hopper (3). The housing (7) has in it a rotating hollow cylindrical drum (9). The drum (9) is operatively connected to an axis (11), which is a drive shaft connected to a motor (not shown).

Figure 3:
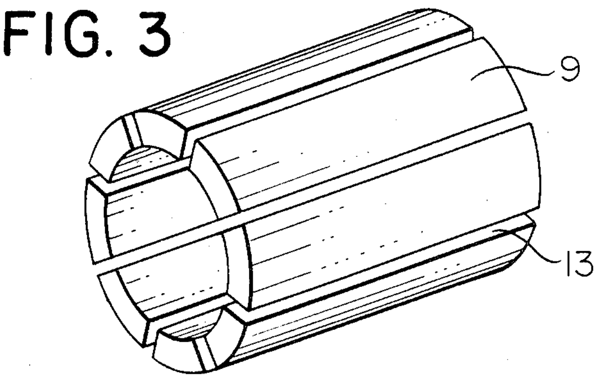
FIG. 3 shows an enlarged view of the drum.

As shown in FIG. 3, the drum (9) has a plurality of slits (13) formed radially through its peripheral body at a certain distance between them. The slits (13) also extend in the axial direction of the periphery body.

Referring again to FIGS. 1 and 2, in each of the slits (13) a blade (15) is inserted. Its dimensions are such that it snugly fits, and is slidable, in the slit.

On the trailing surface of each blade (15), in the direction of rotation of the drum (9), a recess (17) is formed and extends in the radial direction over a distance slightly greater than the thickness of the peripheral body. The recess (17) may axially extend over almost the entire length of the blade (15).

An eccentric cam (19) is fixedly mounted to the end walls (25) of the housing (7) and is positioned in the hollow interior part of the drum (9) in sliding engagement with the axis (11). The periphery of the cam (19) is radially spaced apart from the inner wall of the housing (7) by a distance equal to the radial width of the blades (15). On both end walls of the housing (7) in the area where it faces the hopper (7) steps (21) are formed to hold the blades (15) in place. The steps (21) are spaced apart from the periphery of the cam (19) by a distance that is equal to the blade's radial width. Therefore when the drum (9) is rotated the blades (15) move in the same direction as the drum (9) while the outward ends of the blades (15) engage the inner wall of the housing (7), and the tracks (21) and the inward ends of the blades (15) engage the periphery of the cam (19).

As shown in FIG. 1 the side walls of the housing are connected with the side walls of the hopper (3). The housing (7) also has two end walls (25, FIG. 2) to enclose the drum (9) and the cam (19). The side wall of the housing (7) has an eccentric shaped cross-section so that its inner surface and the periphery of the drum (9) downstream of the portion of the drum (9) facing the hopper (3) in the direction of rotation of the drum (9) shown by an arrow a in FIG. 1 define a space (27) progressively narrowing in its cross-section toward the exit port (23). However, the inner surface of the side wall of the housing (7) contacts the periphery of the drum (9) in the area downstream of the exit port (23) in the direction of rotation of the drum (9) as shown in FIG. 1.

An inner chamber (31) is formed between the periphery of the cam (19) and the inner wall of the peripheral body of the drum (9), except for the area where the cam (19) contacts the drum (9). The cam (19) is designed to have an eccentric shape. The surface of the cam is equidistant from the inner surface of the side wall of the housing. The positional relationship of the cam (19) and the drum (9) is such that the inner chamber progressively enlarges in its cross-section from the position near the hopper (3) toward the exit port (23) in the direction of rotation of the drum, and, after an area of uniform dimensions, narrows towards the downstream end, where the periphery of the cam (19) engages the inner wall of the peripheral body of the drum (9) at the top portion of the housing (7) facing the hopper (3).

Figure 2:
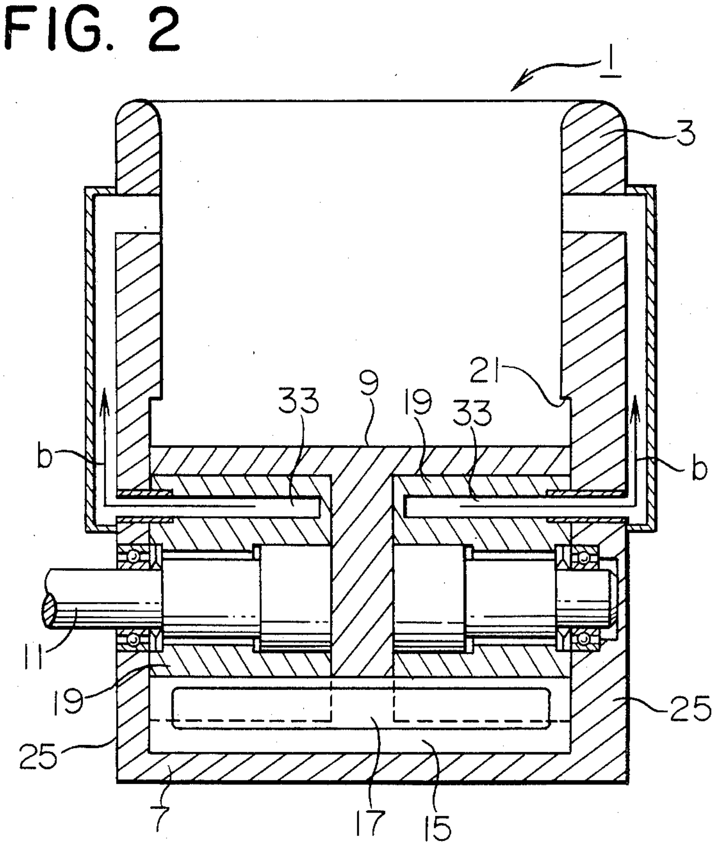
FIG. 2 shows the cross-sectional view of the apparatus cut along the line A—A' in FIG. 1.

Near the point where the inner chamber (31) disappears an exit path (33) is formed. The exit path connects the inner chamber (31) and the hopper (3) through the cam (19) as shown in FIGS. 1 and 2.

In this apparatus a compartment is formed between an adjacent pair of blades (15) in the inner chamber (31) and the space (27). Since the drum (9) and the cam (19) are enclosed in the housing (7), the compartments are sealed by the end walls (25) and the side wall of the housing (7) and the periphery of the cam (19), as shown in FIG. 2.

In operation the drum (9) rotates clockwise as shown by an arrow a in FIG. 1. At the top part of the housing (7) the outward end of the blade (15) protrudes into the hopper (3). When the protruding blade rotates along with the rotation of the drum (9) it pushes the food material into the space (27) between the inner surface of the side wall of the housing (7) and the drum (9). The outward end of the blade (13) engages the inner surface of the side wall of the housing (7) to define a sealed compartment, together with an adjacent blade (15), the drum (9), and the end walls (25). The material introduced into the space (27) is confined in the compartment and moves in the rotational direction a, as shown in FIG. 1.

As the drum (9) rotates the volume of the compartment formed by an adjacent pair of blades, the drum, and the side wall and end walls of the housing (7), progressively decreases. In contrast, the periphery of the cam (19) and the inner wall of the peripheral body of the drum (9) separate from each other to form the inner chamber (31), which progressively enlarges. An adjacent pair of blades (15) also forms a compartment in the inner chamber with the cam, the drum, and the end walls of the housing (7), and the volume of the compartment progressively enlarges as the drum (9) rotates up to the area near the downstream end of the exit port (23).

When the material is introduced from the hopper (3) into the space (27), air tends to be trapped in the material and enters the first formed compartment. As shown in FIG. 1, the air tends to gather at the downstream part of the compartment.

Since the recess (17) of the blade (15) extends over a distance greater than the thickness of the drum (9), at some point during the rotation of the drum (9) the blade (15) becomes positioned so that the recess (17) stretches beyond both surfaces of the drum (9). At this point the space (27) communicates with the inner chamber (31) via a path formed by the recess (17) between a wall of the slit (13) and the blade (15), as shown in FIG. 1. The space in the compartment formed outside of the drum (9) becomes smaller as the drum (9) rotates, and thus the pressure within the compartment increases, while the space of the inner chamber (31) increases and thus the pressure within the compartment inside of the drum (9) decreases. Thus, the pressure of the space (27) becomes much greater than that of the inner chamber (31). Due to the pressure difference, air (35), together with a fractional portion of the material (37), is forced from the space (27) into the inner chamber (31). Thus, as the drum (9) rotates air in the outer compartment is removed from the space (27), and the space (27) is only filled with the material (5) before the compartment arrives at an area adjacent the exit port (23), as shown in FIG. 2.

When the blade (15) arrives at an area near the exit port (23), it moves to a point where the recess (17) does not extend beyond the two surfaces of the drum (9) so that it closes the path for the air. Therefore, the air (35) that is trapped in the inner chamber (31) does not flow back into the material (5) in the exit port (23). As a result, material that is uniform in quantity and density, and that has no remenant of air, is extruded via the exit port (23).

When the blade (15) moves past the exit port (23), the blade (13) retracts to a point where its outward end becomes flush with the periphery of the drum (9), and the periphery of the drum (9) contacts the inner wall of the housing (7). As shown in FIG. 1, the capacity of the inner chamber (31) between any adjacent pair of blades (15) is uniform until the leading blade forming a compartment approaches the point where the blade begins to be exposed to the bottom of the hoppeer (3). From that point on the inner chamber (31) progressively decreases its space until the periphery of the cam (19) contacts the inner wall of the drum (9) and thus the inner chamber (31) disappears at the top part of the housing (7).

As the drum (9) rotates the fractional portion of the material (37) in the inner chamber (31) moves toward the top part of the housing (7), being pushed by the leading surface of the blade (15). Adjacent the top part of the housing (7), where the inner chamber (31) disappears, the exit path (33) is formed through the cam (19) to remove the material (37) and the air (35) trapped in the inner chamber (31) by the propelling force of the blade (15). The material (37) and the air (35) returns to the hopper (3) via the exit path (33) as shown by arrows b in FIG. 2.

Figure 4:
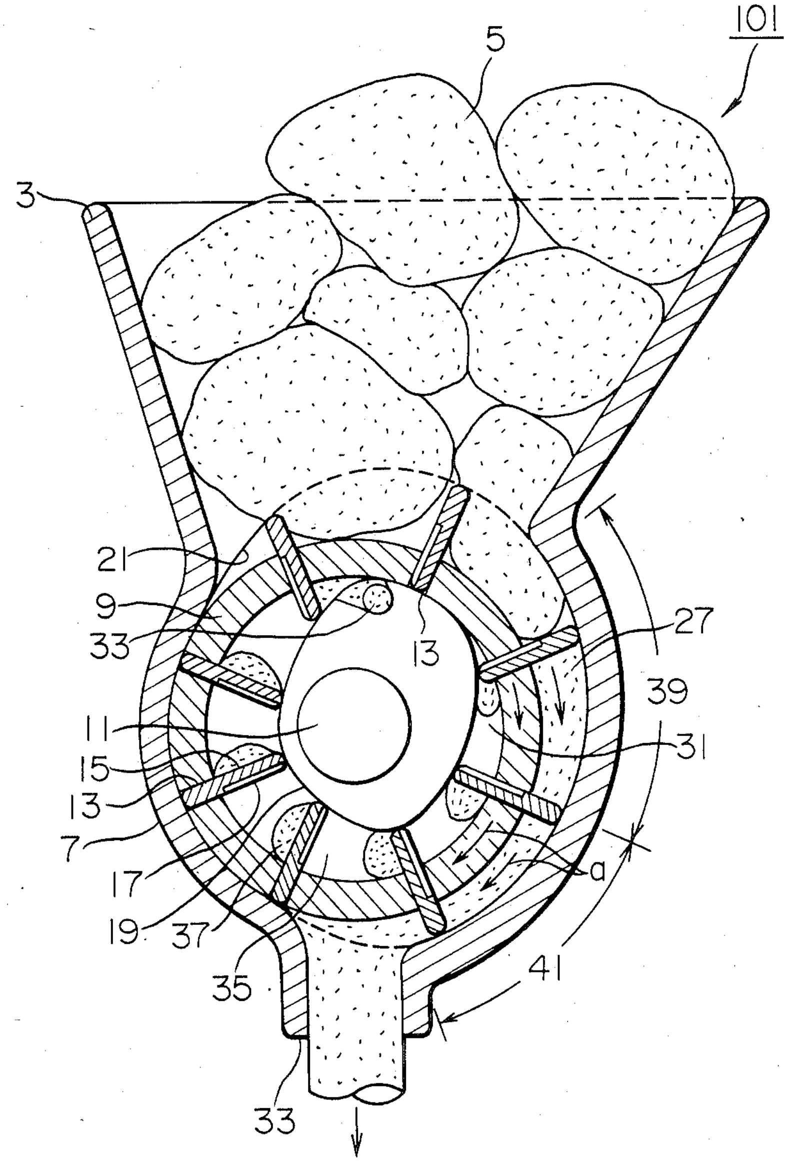
FIG. 4 shows an apparatus of a second embodiment of this invention.

FIG. 4 shows an apparatus (101) of the second embodiment of this invention. The construction of the apparatus (101) is the same as that of the apparatus (1) of the first embodiment except for a section (41) that has uniform dimensions downstream of the decreasing dimension section (39) and adjacent and upstream of the exit port (23) in the rotational direction a. In this section with uniform dimensions (41) the dimensions of the space (27) and those of the inner chamber (31) are uniform. Thus the pressure in the space (27) and the inner chamber (31) defined by an adjacent pair of blades (15) is kept uniform. Where, as in the first embodiment, the space (27) is so formed that its dimensions gradually decrease, the pressure at the upstream portion of the material in any outer compartment is lower than that at the downstream portion. Thus the pressure to extrude the material via the exit port (23) is not uniform, and thus when the material is extruded from the exit port (23) it pulsates at a cycle synchronized with the arrival of the blades (15) at the exit port (23). Therefore the flow rate of the material extruded is not uniform if viewed microscopically. Such a feature can be a drawback for some applications.

In contrast, in the second embodiment the material (5) in the section of uniform dimensions (41) is subjected to uniform pressure throughout the space between an adjacent pair of blades (15) until it is carried to the portion adjacent the exit port (23). Thus it is uniformly extruded from the exit port (23). This section of uniform dimensions (41) should extend at least a distance equal to that between an adjacent pair of blades (15). Moreover, the position of the blade (15) relative to the drum (9) may shift in this section (41) to such a point that the recess (17) on the trailing surface of the blade (15) is concealed behind the periphery of the drum (9) to close the path connecting the space (27) and the inner chamber (31) so that the air (35) in the inner chamber is prevented from flowing back into the space (27).

The apparatus of this invention can quantitatively extrude food material. Since air in the material is completely removed before the material is extruded, it is continuously extruded, and is uniform in quantity and density.

Further, by adding a section of uniform dimensions upstream of and adjacent the exit port in the direction of rotation of the drum, an apparatus for extruding material at a uniform flow rate, even when microscopically viewed, can be provided. The extracted air is removed from the inner chamber and the fractional food material in the inner chamber is recycled to the hopper.

We claim:

1. An apparatus for quantitatively extruding food material comprising (a) a hopper for food material, (b) an eccentrically formed cylindrical housing mounted to the bottom of said hopper, having a cylindrical side wall, which is open at the top part that faces the hopper, and two end walls, and which housing has an exit port positioned away from said hopper, (c) a rotating hollow cylindrical drum disposed in said housing, operatively connected to an axis, said axis in turn being connected to a motor, said drum having a plurality of slits formed radially through the peripheral body thereof and extending in the axial direction of said peripheral body, said side wall of said housing so formed that the periphery of said drum and the inner surface of said side wall of said housing downstream of said hopper in the direction of rotation of said drum defining a space progressively narrowing in its cross-section toward said exit port, and slidably engaging each other downstream of said exit port in the direction of rotation of said drum, (d) a plurality of blades, inserted into each of said slits, and of cross-sectional dimensions defined such that they slidably fit in said slits, each said blade being provided with a recess on its trailing surface extending in the radial direction over a distance slightly greater than the thickness of the peripheral body of said drum, (e) an eccentric cylindrical cam mounted on said axis of said drum, the periphery thereof being radially spaced apart from the inner surface of said side wall of said housing by a distance equal to the radial width of said blades, engaging said peripheral body of said drum at the top portion of said drum and being progressively separated from said peripheral body in the direction of rotation of the drum, defining an inner chamber together with the end walls of the housing, and enlarging in its cross-section toward said exit port, and (f) an exit path connecting said inner chamber to said hopper, wherein each of said blades is slidably movable as said drum rotates along said periphery of said eccentric cam and said inner surface of said side wall of said housing, so that when the rotation brings said blade to face the bottom of said hopper the outward part of said blade is arranged to protrude into said hopper to introduce said food material into said space, while said recess on said blade provides a path from said space to said inner chamber for releasing into said inner chamber the air trapped in a compartment formed by the two adjacent said blades and the drum and the housing, and to retract to a point where the outward end of said blade becomes flush with the periphery of said drum when said blade has moved past said exit port.

2. The apparatus of claim 1, wherein said space comprises a section having uniform dimensions adjacent said exit port upstream thereof in the direction of rotation of said drum.

3. The apparatus of claim 2, wherein said section extends over a distance that is at least the same as the distance between any adjacent pair of said blades.

4. The apparatus of claim 1 or 2, wherein said exit path is positioned near the top part of said inner chamber and said inner chamber is formed so that it narrows in cross-section toward said exit path.

5. The apparatus of claim 1 or 2, wherein said exit path is formed through said eccentric cam.

6. The apparatus of claim 1 or 2, further comprising a track for said blades provided on the end walls of the housing in the area where it faces the hopper, said track being radial and equidistant from the surface of said eccentric cam by a distance equal to the radial width of each said blade.

7. The apparatus of claim 1, wherein said blade is adapted to move relative to said drum to close said path from said space to said inner chamber when it arrives at an area adjacent said exit port.

8. The apparatus of claim 2, wherein said blade is adapted to move relative to said drum to close said path from said space to said inner chamber when it arrives at said uniform dimensional section.

* * * * *